United States Patent [19]

Guerin et al.

[11] Patent Number: 5,006,602

[45] Date of Patent: Apr. 9, 1991

[54] POLYVINYLIDENE FLUORIDE COMPOSITIONS AND PRODUCTS MADE THEREFROM

[75] Inventors: Bernard Guerin, Bures Sur Yvette; Albert Strassel, Oullins, both of France

[73] Assignee: Atochem, France

[21] Appl. No.: 948,019

[22] Filed: Dec. 31, 1986

[30] Foreign Application Priority Data

Jan. 7, 1986 [FR] France ............................. 86 00136

[51] Int. Cl.$^5$ ............... C08L 27/16; C08L 51/04
[52] U.S. Cl. ............................. 525/72; 524/306; 525/75; 525/77; 525/79; 525/80; 525/84
[58] Field of Search ............... 525/72, 75, 77, 79, 525/80, 84

[56] References Cited

U.S. PATENT DOCUMENTS 3,242,110 3/1966 Korpman ..................... 525/164
4,382,358 5/1983 Tappe et al. ................... 525/72

FOREIGN PATENT DOCUMENTS 127957 10/1977 Japan ................................. 524/315

*Primary Examiner*—Jacob Ziegler
*Attorney, Agent, or Firm*—Sigalos, Levine & Montgomery

[57] ABSTRACT

A composition consisting essentially of a polyvinylidene fluoride polymer or copolymer having distributed substantially uniformly therethrough elastomeric particles, said elastomer being capable of absorbing hydrocarbons and fixing them in the composition and being present in an amount sufficient to increase the elongation and flexibility of the composition in the presence of hydrocarbons and shaped articles made therefrom.

9 Claims, No Drawings

POLYVINYLIDENE FLUORIDE COMPOSITIONS AND PRODUCTS MADE THEREFROM

BACKGROUND OF THE INVENTION

The present invention concerns the improvement of the properties of polyvinylidene fluoride (PVDF) and, more particularly, of its flexibility, on contact with hydrocarbons. This improvement is contributed by incorporating an elastomer into the PVDF. By "PVDF" is meant not only the homopolymer, but also the copolymers obtained by copolymerization of at least 70% by weight of vinylidene fluoride with another fluorinated monomer. However, the homopolymer is preferred.

PVDF is a semicrystalline polymer whose essential mechanical, electrical, thermal, permeability and chemical resistance properties depend on its crystallinity. However, after the PVDF is placed in service this crystalline state is the cause of the low elongation at breakpoint and of stretching at the flow threshold. These drawbacks prevent the use of PVDF in a certain number of applications and, in particular, in the use of PVDF pipes for use with hydrocarbon streams.

In order to remedy the drawbacks cited, it has been proposed to graft a nonfluorinated ethylene compound to the PVDF homopolymer or to copolymerize it with the vinylidene fluoride. Although the drawbacks noted are diminished, they are unfortunately compensated for by a loss of other soughtafter properties of the PVDF.

In the special application of PVDF to the transport of hydrocarbons, such as, for instance, the pipes serving for the extraction of petroleum products, it has been proposed as in French application (FR.A) 2,560,884 to incorporate liquid plasticizers into the PVDF; a plasticizer, for instance, of the polyester type. This technique makes it possible to improve the elongation at the flow threshold of the PVDF and consequently to fabricate petroleum hose without the risk of breaking and processing a sufficient flexibility. With this pipe operating several years the hydrocarbons extract and carry away the plasticizer, an then one observes that the PVDF has lost its flexibility, resulting in the breaking of these pipes under high bending or stress.

SUMMARY OF THE INVENTION

The present invention makes it possible to remedy the drawbacks cited, while at the same time preserving the PVDF's crystallinity and, consequently, its desired properties.

Briefly stated, the present invention comprises a composition consisting essentially of a polyvinylidene fluoride polymer or copolymer having distributed substantially uniformly therethrough elastomeric particles, said elastomer being capable of absorbing hydrocarbons and fixing them in the composition and being present in an amount sufficient to increase the elongation and flexibility of the composition in the presence of hydrocarbons.

The invention also comprises shaped articles made from such compositions as hereinafter described.

DETAILED DESCRIPTION

The critical aspect of the present invention is incorporating the elastomer particles substantially uniformly throughout the mass of the composition.

While preserving the integrity of the macromolecular composition of the PVDF, the incorporation of these particles makes it possible at least to preserve, if not to improve when in contact with hydrocarbons its degree of elongation within the elastic limit and as a consequence its elongation breakpoint. The notion of elastic limit, such as understood presently, is measured from the tensile curve giving the tensile force as a function of the elongation. This top called "flow threshold" separates the zone of elastic behavior with slight elongations from the zone of plastic flow for higher elongations. This notion is developed in "Introduction to Macromolecular Chemistry" (in French) by G. CHAMPETIER and L. MONNERIE, pages 471-478.

Editor MASSON & Cie. By way of example, the elongation at the flow threshold between −30° and +150° C. for PVDF is customarily below 10%. The incorporation of plasticizer permits increasing this elongation in considerable fashion by making it go to about 20%, but this is a temporary condition when the PVDF is in contact with a hydrocarbon. On the other hand, according to the present invention, after a more or less prolonged contact with the hydrocarbons, this same elongation can increase in a lasting manner to more than 100% and always in lasting manner to at least about 15%.

As used herein, the term "elastomer" means naturally-occurring as well as synthetic elastomers such as thermoplastic elastomeric polymers or copolymers.

The natural or synthetic elastomers correspond to the often employed phrases of natural or synthetic rubbers and are well-known materials. They are defined by ASTM, Special Technical Bulletin, No. 184, as materials which at ambient temperature can be elongated to twice their proper length and which, once relaxed after being maintained under tension for five minutes, take up their initial length again to within 10% of the same time.

Elastomeric thermoplastic resins are polymers or copolymers which, alone without addition of plasticizer, possess a rubbery behavior with slight deformation as defined above. This rubbery behavior is characterized by an elongation at the flow threshold of above 20%. These thermoplastics possess a modulus of elasticity on bending below or equal to 800 MPa at ambient temperature.

The elastomers especially preferred within the scope of the present invention can be selected from among natural rubbers, polyurethanes, ethylene-propylene rubbers (EPDM), acrylonitrile-butadiene-styrene copolymers, methylme-thacrylate-butadiene-styrene (MBS) copolymers, ester-amide and ether-amide copolymers, ethylene-carbon monoxide copolymers, acrylic rubbers, thermoplastic copolyethers-esters, sequenced copolymers based on polystyrene and on elastomers of the polyisoprene, polybutadiene and the like type, styrene-butadiene-styrene copolymers, the copolymers of ethylene-ethylacrylate, ethylene-ethylacetate and ethylene-vinylacetate as well as their terpolymers, and mixtures thereof.

These elastomers combined with PVDF possess the ability to absorb and retain a certain quantity of hydrocarbon, preferably above 20% of its weight, which is going to play the role of plasticizer of the PVDF, thus conferring excellent elongation properties on it, without making it lose its other qualities.

The quantity of elastomer incorporated into the PVDF should not exceed about 25% and preferably will be below about 20%, but in any event is added in an amount sufficient to increase the elongation and flexibility of the PVDF to the degree desired. This can be determined by routine testing and will vary dependent upon the combination of the particular PVDF homopolymer and copolymer used and particular elastomer used.

Within the scope of the invention the PVDF composition can contain all the usual and customary additives in their usual properties and for their usual effect. It is not excluded to incorporate a plasticizer into the mixture. The addition of this plasticizer can initially have an effect on the elongation of the PVDF with this effect being with time, as its elimination by the hydrocarbons progresses, compensated for by that of the hydrocarbon absorbed by the elastomer.

The dimensions of the elastomer particles to be incorporated into the PVDF are not critical in the sense that these dimensions evolve by virtue of the means used in order to achieve the composition. The most usual means of obtaining the composition consists of mixing, in the molten state, the two principal components initially in the form of powders or granules, in an extruder, a mixer with cylinders, or any other adapted mixing apparatus. It is likewise possible to mix with a PVDF latex either the desired quantity of elastomer powder or an elastomer latex. It goes without saying that the elastomer's effectiveness in the composite will depend on the satisfactory distribution of the elastomer in the PVDF; i.e., substantially uniform distribution.

The composition according to the invention is particularly recommended for use in making articles that are required to work under stress in the presence of hydrocarbons More particularly, the compositions are used to make articles such as flexible pipes and hoses used for the extraction of hydrocarbons in the petroleum industry. Such must preserve their properties, in particular their property of flexibility for prolonged durations, often several years, under difficult conditions of dynamic fatigue on bending and of temperature varying from about 60° to 150° C.

In the particular case of pipes, these are made classically by extrusion, or coextrusion with another thermoplastic, of the composition of the invention. It is moreover not excluded for the composition to be directly formed during the fabrication of said pipes; with the PVDF and the elastomer being mixed, in adequate proportions, in the extruder serving for the shaping of the pipes. These pipes are usually reinforced on the exterior with a metallic sheath.

This invention will be further described in connection with the following examples which are set forth for purposes of illustration only.

EXAMPLES 1 TO 4

By means of a mixer (BUSS PR 46) heated to 190° C., 10% by weight of each of the following elastomers are incorporated into PVDF (Foraflon 6000 HD):

Example 1: methylmethacrylate grafted alkylacrylate elastomer (Paraloid 323 B).
Example 2: polyurethane polyester (Elastolan 60 AW).
Example 3: EPDM.
Example 4: Sequenced polyether ester-amide (Pebax 2533).

The mixtures, granulated after a first pass are put back into the mixer, then regranulated.

In a press with plates heated to 205° C., panels of 0.7 mm thickness are made from these granulated mixtures. The pressure exerted on the plates amounts to 70 kgcm$^2$ for 3 minutes. The panels are removed and immediately hardened in water at ambient temperature.

Tensile samples are cut out, then according to ASTM standard D 1709-06 at a rate of 50 mm/min, a tensile test is carried out on sample specimens preserved 40 days at 130° C. in air and in oil. The results obtained are given in the following Table I:

TABLE I

|  | Control | After 40 days at 130° C. | | Control | After 40 days at 130° C. | |
|---|---|---|---|---|---|---|
|  |  | in air | in oil |  | in air | in oil |
| PVDF alone | 9 | 9 | 9 | 52 | 52 | 52 |
| Example 1 | 12 | 11 | 33 | 122 | 31 | 65 |
| Example 2 | 12 | 18 | 35 | 360 | 61 | 98 |
| Example 3 | 10 | 8 | 35 | 150 | 16 | 39 |
| Example 4 | 7 | 8 | 41 | 342 | 31 | 65 |

These results demonstrate the importance of the penetration of oil into the composite by means of the elastomer, the latter itself contributing only little advantage to the elongation at the threshold in relation to PVDF alone.

EXAMPLES 5 TO 8

Under the conditions of Example 1, 10% of dibutylsebacate (DBS) are incorporated as plasticizer (Example 5) into the PVDF. Still under the conditions of Example 1; 5, 10 and 15% by weight of MBS (METHABLEN C) are incorporated into these plasticized granulated mixtures; respectively, Examples 6, 7, and 8.

After preservation of the test specimens at 130° C. in air or in oil for 7½ days, 17, and 31 days, the elongation at the flow threshold as well as the weight evolution of the test specimens are measured. The results are given in Table II below.

This table illustrates the influence of the elastomer when the composite is in contact with the oil. According to Example 5 one can see the drop in the time of the elongation at the threshold of the PVDF in a parallel manner to the loss of plasticizer. On the contrary, in Examples 6, 7, and 8 one can see that the elastomer does not have in itself any influence in the air on the elongation at the threshold of the PVDF and on the exudation of the plasticizer, but that its influence is important in oil, the losses of plasticizer being partially or totally compensated for by the oil, which makes it possible to improve the elongation at the threshold of the PVDF.

On the other hand, the loss of plasticizer out of the PVDF likewise involves a shrinkage of the material. Over great lengths, this contraction causes internal stresses rendering the PVDF more fragile to impact and diminishing its aptitude on elongation and on fatigue. This contraction is measured on pipes fabricated from the materials of Examples 5, 6, and 7 after 7 days at 150° C. in air and in oil. The results are given in Table III below. One can see that the contraction is highly diminished for the pipe of PVDF based on elastomer having stayed in the oil.

TABLE II

| | Elongations at the Flow Threshold | | | | | | | Weight Evolution of the Test Specimens | | | | | |
|---|---|---|---|---|---|---|---|---|---|---|---|---|---|
| | Control | 180 hours | | 17 days | | 31 days | | 7½ days | | 17 days | | 31 days | |
| | 23° C. | Air | Oil | Air | Oil | Air | Oil | Air | Oil | Air | Oil | Air | Oil |
| Example 5 | 18 | 10 | 21 | 12 | 16 | 5 | 9 | −9.7 | −8.7 | −9.8 | −8 | −9.8 | −8 |
| Example 6 | 19 | 14 | 36 | 9 | 30 | 7 | 38 | −8.3 | −4.7 | −8.7 | −4.5 | −8.9 | −4.5 |
| Example 7 | 18 | 11 | 72 | 9 | 72 | 5 | 108 | −7.6 | −2.5 | −7.6 | −2.4 | −8.5 | −2.3 |
| Example 8 | 31 | 8 | 86 | 9 | 53 | 4 | 131 | −6.9 | +1.5 | −7.1 | +0.9 | −8.0 | +0.8 |

TABLE III

| | Contraction in % | |
|---|---|---|
| | 150° in Air | 150° in Oil |
| Example 5 | 7.2 | 6.0 |
| Example 6 | 6.8 | 4.3 |
| Example 7 | 6.8 | 2.5 |

EXAMPLES 9 and 10

Under the conditions of Example 1, 10 and 20% by weight of MBS are incorporated into the PVDF, respectively, as Examples 9 and 10. The test specimens are immersed at 110° C. for 7½ days, 17 days, and 31 days. The comparative results with the test specimens preserved in air are given in Table IV below.

TABLE IV

| | Elongations at the Flow Threshold | | | | | | | Weight Evolution of the Test Specimens | | | | | |
|---|---|---|---|---|---|---|---|---|---|---|---|---|---|
| | Control | 180 hours | | 17 days | | 31 days | | 7½ days | | 17 days | | 31 days | |
| | 23° C. | Air | Oil | Air | Oil | Air | Oil | Air | Oil | Air | Oil | Air | Oil |
| Example 9 | 8 | 16 | 36 | 9 | 61 | 5 | 61 | +0.7 | +4.6 | +0.7 | +4.6 | −0.2 | +4.7 |
| Example 10 | 9 | 16 | 95 | 16 | 88 | 5 | 131 | +0.9 | +8.7 | +1.0 | +8.7 | +0.6 | +8.7 |

While the invention has been described in connection with a preferred embodiment, it is not intended to limit the scope of the invention to the particular form set forth, but, on the contrary, it is intended to cover such alternatives, modifications, and equivalents as may be included within the spirit and scope of the invention as defined by the appended claims.

What is claimed is:

1. A composition consisting essentially of a polyvinylidene fluoride polymer or copolymer having distributed substantially uniformly therethrough elastomeric particles, said elastomer being capable of absorbing hydrocarbons and fixing them in the composition and being present in an amount sufficient to increase the elongation and flexibility of the composition in the presence of hydrocarbons.

2. The composition of claim 1, wherein the elastomer is selected from a natural elastomer or an elastomeric thermoplastic polymer or copolymer.

3. The composition of claim 2, wherein the elastomeric thermoplastic polymer or copolymer has a modulus of elasticity on flexing equal to or below about 800 MPa at ambient temperature.

4. The composition of claim 3, wherein the elastomeric thermoplastic polymer or copolymer has an elongation at the flow threshold above about 20%.

5. The composition of claim 1, 2, 3, or 4, wherein the composition contains less than about 25% by weight of elastomer and the polyvinylidene fluoride is a homopolymer.

6. The composition of claim 1, 2, 3, or 4, wherein the composition also contains a plasticizer for the polyvinylidene fluoride and the polyvinylidene fluoride is a homopolymer.

7. A shaped article suitable for use in contact with hydrocarbons and capable of absorbing hydrocarbons consisting essentially of the composition of claim 1, 2, 3, or 4.

8. The article of claim 7, wherein said article is a pipe or hose.

9. The article of claim 7 or 8, wherein said composition contains less than 25% by weight of an elastomer and also contains a plasticizer for the polyvinylidene fluoride.

* * * * *